(12) United States Patent
Cook et al.

(10) Patent No.: US 8,820,120 B2
(45) Date of Patent: Sep. 2, 2014

(54) PULL-ROLLS FOR USE IN GLASS MANUFACTURING PROCESSES AND METHODS FOR MAKING THE SAME

(75) Inventors: Glen Bennett Cook, Elmira, NY (US); Michael Thomas Gallagher, Corning, NY (US); Paul Oakley Johnson, Corning, NY (US); Lewis Kirk Klingensmith, Corning, NY (US); Ralph Alfred Langensiepen, Corning, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 127 days.

(21) Appl. No.: 13/477,719

(22) Filed: May 22, 2012

(65) Prior Publication Data

US 2012/0297836 A1 Nov. 29, 2012

Related U.S. Application Data

(60) Provisional application No. 61/489,845, filed on May 25, 2011.

(51) Int. Cl.
*C03B 13/16* (2006.01)
*C03B 17/06* (2006.01)

(52) U.S. Cl.
CPC ............... *C03B 13/16* (2013.01); *C03B 17/068* (2013.01)
USPC ........................................................ 65/370.1

(58) Field of Classification Search
CPC ................................ C03B 13/16; C03B 17/068
USPC ....................................................... 65/370.1
See application file for complete search history.

(56) References Cited

U.S. PATENT DOCUMENTS

| | | | |
|---|---|---|---|
| 2,709,158 A | 5/1955 | Bouchet | 252/378 |
| 2,842,183 A | 7/1958 | Gaines, Jr. | 154/2.6 |
| 3,001,571 A | 9/1961 | Hatch | 154/2.6 |
| 6,896,646 B2 | 5/2005 | Kaiser et al. | 492/40 |
| 7,008,513 B2 | 3/2006 | Davenport et al. | 162/361 |
| 7,507,194 B2 | 3/2009 | Neubauer et al. | 492/40 |
| 7,624,646 B2 | 12/2009 | Neubauer et al. | 73/825 |
| 7,842,632 B2 | 11/2010 | Neubauer et al. | 501/95.1 |
| 2004/0007021 A1 | 1/2004 | Igo et al. | 65/101 |
| 2005/0212158 A1* | 9/2005 | Kaiser | 264/40.5 |

(Continued)

FOREIGN PATENT DOCUMENTS

WO  WO2010/111341  9/2010  ............. B21B 27/02

*Primary Examiner* — Matthew Daniels
*Assistant Examiner* — Cynthia Szewczyk
(74) *Attorney, Agent, or Firm* — Kevin M. Able; Matthew J. Mason; Thomas R. Beall

(57) ABSTRACT

Pulling rolls for used in forming glass ribbons with reduced defects and cracking are disclosed. In one embodiment, the pulling roll may include a shaft member and a roll assembly. The roll assembly may be positioned on the shaft member for rotation with the shaft member. The roll assembly may include an axially compressed stack of ring elements formed from an inorganic material such as mica paper. The mica paper may include layers of overlapping mica platelets oriented substantially in parallel with one another. A contact surface of the roll assembly may have a Shore D hardness greater than or equal to about 10 and less than or equal to about 60.

18 Claims, 9 Drawing Sheets

(56) References Cited

U.S. PATENT DOCUMENTS

| | | | |
|---|---|---|---|
| 2007/0042883 A1 | 2/2007 | Daily et al. | 492/40 |
| 2008/0120995 A1* | 5/2008 | Neubauer et al. | 65/33.7 |
| 2009/0149310 A1 | 6/2009 | Neubauer et al. | 501/95.2 |
| 2009/0272151 A1 | 11/2009 | Lacasse et al. | 65/374.13 |
| 2010/0037701 A1 | 2/2010 | Neubauer | 73/819 |
| 2010/0218559 A1* | 9/2010 | Bucko et al. | 65/253 |
| 2010/0292062 A1 | 11/2010 | Neubauer et al. | 492/49 |
| 2011/0023547 A1 | 2/2011 | Neubauer et al. | 65/90 |

* cited by examiner

PULL-ROLLS FOR USE IN GLASS MANUFACTURING PROCESSES AND METHODS FOR MAKING THE SAME

CROSS REFERENCE TO RELATED APPLICATIONS

This application claims the benefit of priority under 35 U.S.C. §119 of U.S. Provisional Application Ser. No. 61/489,845 filed May 25, 2011 and entitled "Pull-Rolls For Use In Glass Manufacturing Processes And Methods for Making The Same," the content of which is relied upon and incorporated herein by reference.

BACKGROUND

1. Field

The present specification generally relates to pulling rolls for use in the manufacture of sheet glass in a glass manufacturing process.

2. Technical Background

Pulling rolls are used in the manufacture of sheet glass to apply a vertical pulling force to a ribbon or web of glass from which individual sheets are formed. The amount of pulling force applied by the pulling rolls to the glass is utilized to control the nominal thickness of the glass as the glass is drawn from molten glass, such as in an overflow downdraw fusion process, as described in U.S. Pat. Nos. 3,338,696 and 3,682,609, or a similar process. In addition to a main pulling roll, additional rolls are sometimes used in ribbon drawing processes to stabilize ribbon motion, or to create horizontal tension across the glass ribbon. Though generically referred to as pulling rolls, these rolls can sometimes be run without drive motors so that the rolls turn because of the contact with the moving glass ribbon. Whether driven or idled, rolls which contact the ribbon during the drawing process are referred to as pulling rolls.

Pulling rolls are generally designed to contact the glass web at its outer edges, usually in an area just inboard of the thickened beads that form at the very edges of the glass ribbon. An important aspect of roll function is to avoid cracking of the ribbon which can cause process outages and restarts. Because the pulling rolls are in direct contact with the surface of the glass ribbon, damage to the surface of the glass occurs from contact with the pulling rolls. In addition, tramp glass particles can become embedded in the surface of the pulling roll resulting in additional damage to the glass as the pulling rolls contact the glass.

Accordingly, alternative pulling roll designs are needed.

SUMMARY

The embodiments described herein relate to pulling rolls for drawing glass ribbon from molten glass which reduce the occurrence of defects and cracking in the glass ribbon.

According to one embodiment, a pulling roll for use in forming glass ribbons with reduced defects and cracking may include a shaft member and a roll assembly. The roll assembly may be positioned on the shaft member for rotation with the shaft member. The roll assembly may include an axially compressed stack of ring elements formed from mica paper. The mica paper may include layers of overlapping mica platelets oriented substantially in parallel with one another. A contact surface of the roll assembly may have a Shore D hardness greater than or equal to about 10 and less than or equal to about 60.

In another embodiment, a pulling roll for use in forming glass ribbons with reduced defects may include a shaft member and a roll assembly. The roll assembly may be positioned on the shaft member for rotation with the shaft member. The roll assembly may include an axially compressed stack of ring elements formed from inorganic material. A core portion of the roll assembly may have a Shore D hardness which is greater than a Shore D hardness of a contact surface of the cladding portion. The contact surface of the roll assembly may have a Shore D hardness greater than or equal to about 10 and less than or equal to about 60.

In yet another embodiment, a pulling roll for use in forming glass ribbons with reduced defects may include a shaft member and a roll assembly. The roll assembly may include a first plurality of ring elements, individual ones of the first plurality of ring elements having a first outer diameter. The roll assembly may also include a second plurality of ring elements. Individual ones of the second plurality of ring elements may have a second outer diameter less than the first outer diameter. The first plurality of ring elements may be interspersed with the second plurality of ring elements on the shaft member to form the roll assembly. The first plurality of ring elements and the second plurality of ring elements may be formed from mica paper. A contact surface of the roll assembly may have a Shore D hardness greater than or equal to about 10 and less than or equal to about 60.

Additional features and advantages of the present disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
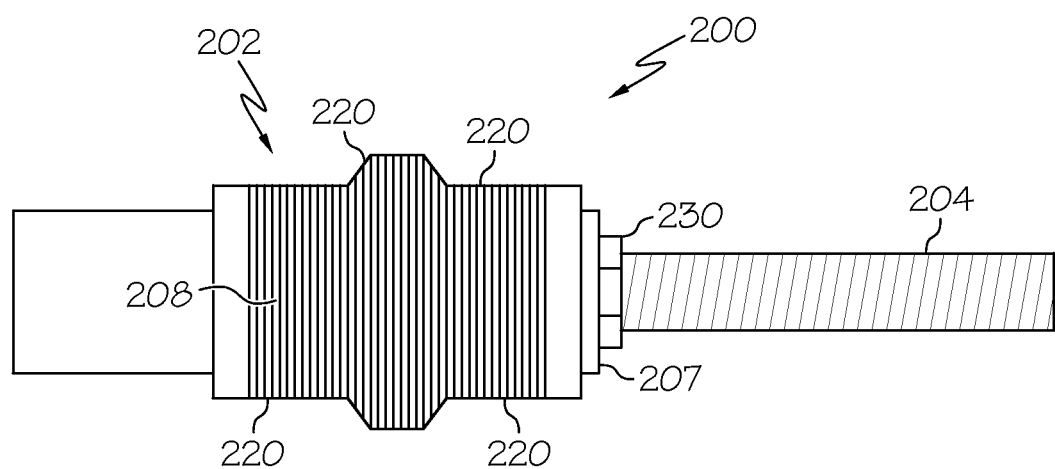
FIG. 2 schematically depicts a pulling roll for drawing glass ribbons, according to one or more embodiments shown and described herein.

Reference will now be made in detail to various embodiments of pulling rolls for use in the manufacture of glass sheets and methods for making and using the pulling rolls. Whenever possible, the same reference numerals will be used throughout the drawings to refer to the same or like parts. One embodiment of a pulling roll is schematically depicted in FIG. 2. The pulling roll generally comprises a plurality of ring elements formed from inorganic material, such as mica paper, which are stacked and compressed to obtain a roll assembly having a Shore D hardness in the range from about 10 Shore D to about 60 Shore D. In some embodiments, the roll assembly of the pulling roll may include a core portion surrounded by a cladding portion with the core portion having a Shore D hardness which is greater than the Shore D hardness of the contact surface of the roll assembly. The pulling rolls and methods for forming and using pulling rolls will be described in further detail herein with reference to the appended drawings.

Glass sheet materials may generally be formed by melting glass batch materials to form molten glass and forming the molten glass into a glass ribbon. Exemplary processes include the float glass process, the slot draw process and the fusion downdraw process. In each of these processes, one or more pulling rolls may be utilized to contact the glass and convey the glass in a downstream direction.

Figure 1A:
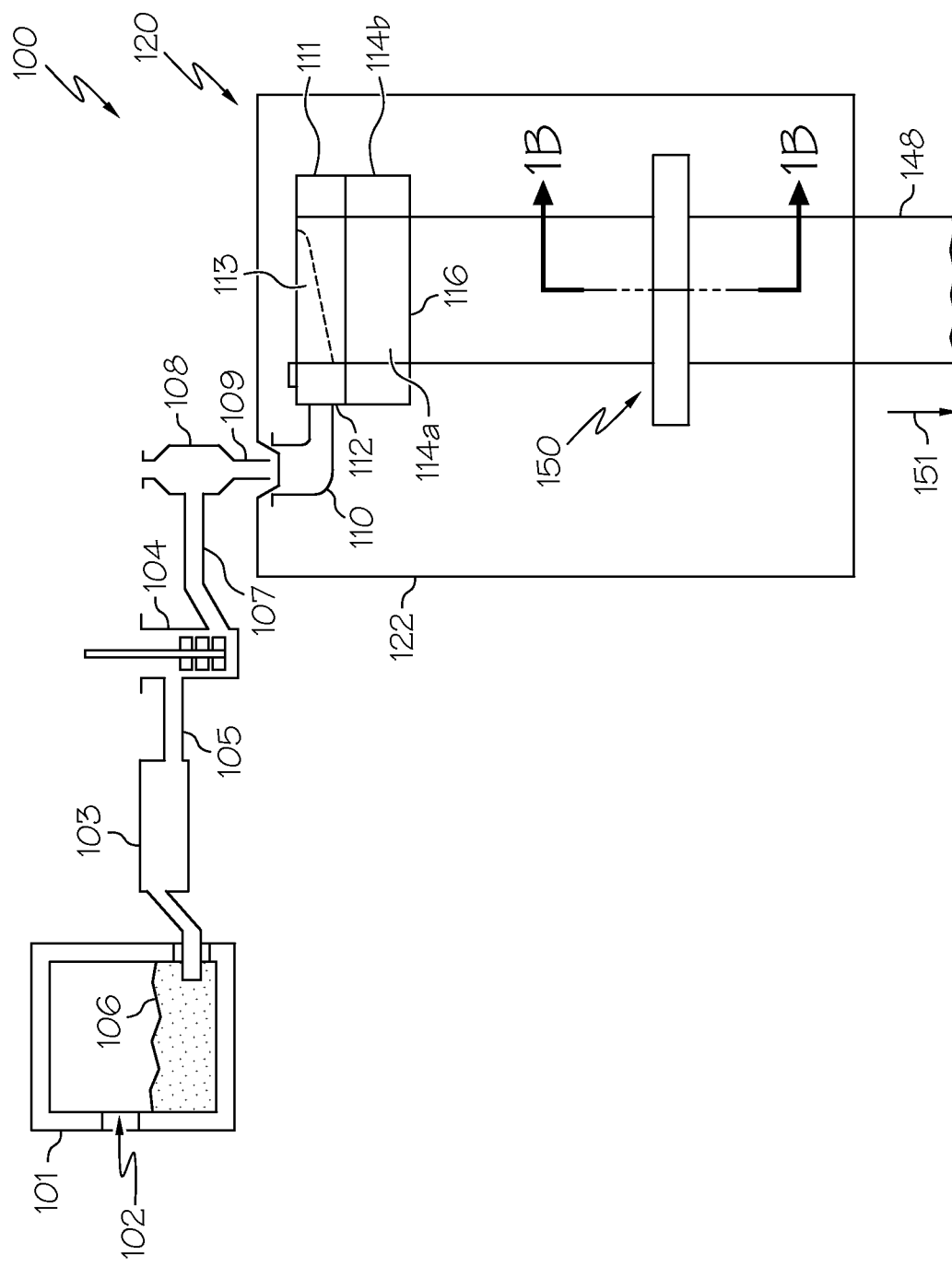
FIG. 1A schematically depicts an apparatus for forming glass ribbons from molten glass, according to one or more embodiments shown and described herein.

Referring to FIG. 1A by way of example, an exemplary glass manufacturing apparatus 100 for forming glass ribbons from molten glass is schematically depicted in which a fusion draw machine is used to form the molten glass into glass ribbons. The glass manufacturing apparatus 100 includes a melting vessel 101, a fining vessel 103, a mixing vessel 104, a delivery vessel 108, and a fusion draw machine (FDM) 120. Glass batch materials are introduced into the melting vessel 101 as indicated by arrow 102. The batch materials are melted to form molten glass 106. The fining vessel 103 has a high temperature processing area that receives the molten glass 106 from the melting vessel 101 and in which bubbles are removed from the molten glass 106. The fining vessel 103 is fluidly coupled to the mixing vessel 104 by a connecting tube 105. That is, molten glass flowing from the fining vessel 103 to the mixing vessel 104 flows through the connecting tube 105. The mixing vessel 104 is, in turn, fluidly coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110, a forming vessel 111 and at least one draw assembly 150 are positioned. As shown in FIG. 1A, the molten glass 106 from the downcomer 109 flows into an inlet 110 which leads to the forming vessel 111. The forming vessel 111 includes an opening 112 that receives the molten glass 106 which flows into a trough 113 and then overflows and runs down two converging sides 114a and 114b before fusing together at a root, where the two sides join, before being contacted and drawn in a downstream direction 151 by the draw assembly 150 to form a continuous glass ribbon 148.

While the pulling rolls 200 have been described herein as being used in conjunction with an apparatus which utilizes a fusion draw machine to form the glass ribbon, it should be understood that the pulling rolls may be used with similar processes in which glass batch materials are melted to form molten glass and the molten glass is then formed into a glass ribbon. By way of example and not limitation, the pulling rolls described herein may also be utilized in conjunction with up-draw processes, slot-draw processes, float-draw processes and other, similar processes.

Figure 1B:
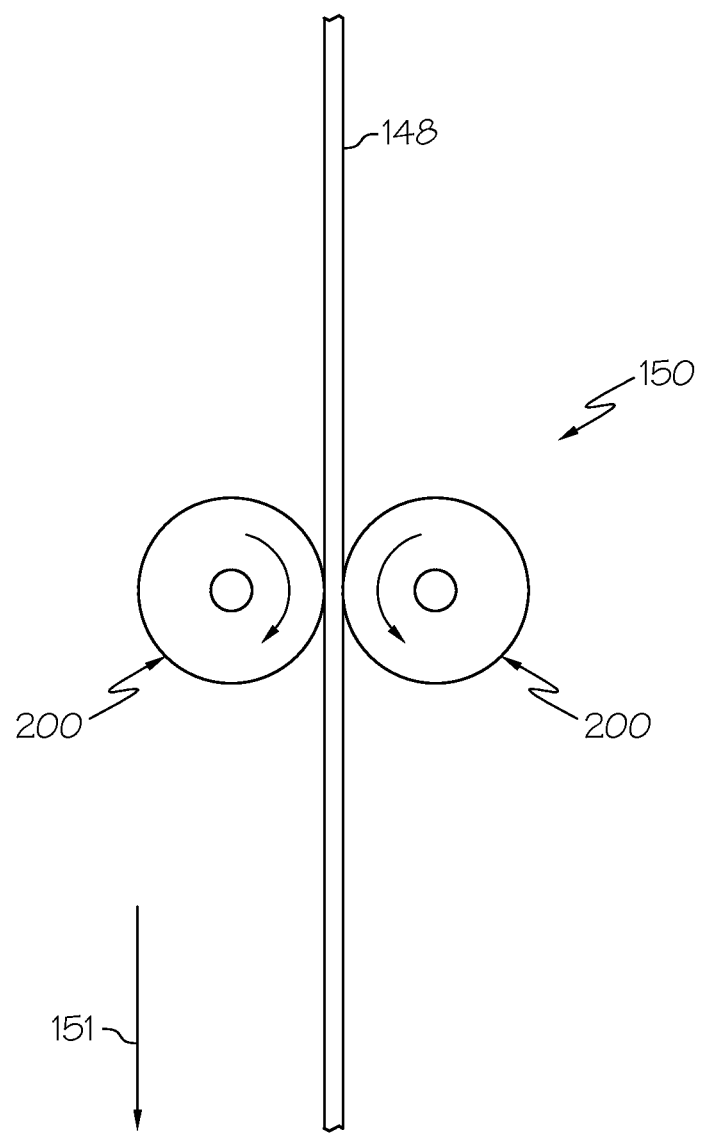
FIG. 1B schematically depicts a cross section of a draw assembly for use in drawing a glass ribbon.

Referring to FIG. 1B, a cross section of the draw assembly 150 is schematically depicted. As shown in FIG. 1B, the draw assembly 150 generally comprises a pair of opposed pulling rolls 200 which contact the glass ribbon 148 on opposite sides. The pulling rolls 200 may be powered (i.e., the pulling rolls 200 are actively rotated and thus impart a drawing force which conveys the glass ribbon 148 in the downstream direction 151) or passive (i.e., the pulling rolls 200 contact the glass ribbon 148 and stabilize the glass ribbon as it is drawn in the downstream direction 151 by other pulling rolls).

The pulling rolls 200 exert a drawing force to thin the glass ribbon 148 to a desired final thickness. The pinching force applied to the pulling rolls 200 may cause surface damage due to contact between the pulling rolls 200 and the glass ribbon 148. In particular, glass particles (commonly referred to as tramp glass), condensates from the glass forming process, and/or other debris which become trapped between the contact surface of the pulling rolls and the surface of the glass ribbon can also cause significant surface damage and/or crack outs as the debris is impinged against the surface of the glass ribbon. For example, tramp glass and/or debris can become embedded in the surface of the pulling roll resulting in damage to the glass ribbon as the pulling rolls contact the glass. Specifically, when the tramp glass is impinged against the surface of the glass ribbon by the pulling roll, the debris causes a localized stress concentration of the pinch force and very high point loading stresses which may cause the glass to fracture and fail. Higher pinch forces decrease the failure threshold strength of the glass ribbon and also generates larger internal glass stresses which may increase the propensity of the glass ribbon to fail by cracking (so called "crack outs") which, in turn, cause process downtime as the ribbon of glass is re-threaded through the apparatus. The sensitivity of the glass ribbon to failures caused by the pinch force is dependent on the thickness of the glass ribbon with thinner glass ribbons being more susceptible to damage and/or failure due to higher pinch forces.

Embodiments of the pulling rolls described herein are capable of enveloping debris and other particulate matter thereby mitigating the formation of defects in glass ribbons drawn with the pulling rolls and crack outs.

Referring now to FIG. 2, an exemplary pulling roll 200 for use in drawing glass ribbons with reduced defects is schematically depicted. The pulling roll 200 general includes a roll assembly 202 positioned on a shaft member 204. The roll assembly 202 is formed from a compressed stack of discrete ring elements 220. In the embodiments described herein, each ring element 220 is formed from an inorganic material such as a single ply of mica paper, or another inorganic material (i.e., ceramic materials, metallic alloys and the like) suitable for use at elevated temperatures. The ring elements 220 are axially stacked on the shaft member 204 and compressed to form the roll assembly 202. The number of ring elements 220 in the roll assembly 202 may vary depending on the desired dimensions of the roll assembly 202, the thickness of the ring elements 220, and the desired mechanical properties (i.e., the hardness) of the contact surface of the roll assembly 202.

In an exemplary embodiment, the roll assembly may be formed from mica paper. The mica paper from which the ring elements 220 may be formed generally comprises layers of overlapping mica platelets oriented substantially in parallel with one another and joined together by van der Waals forces, electrostatic forces, sintering, and/or the like. This configuration of the mica platelets provides for maximum stability of the resultant mica paper. In at least one embodiment the mica paper is formed without the addition of a binder or any other matrix of material in which the mica platelets are embedded. The mica platelets in the mica paper generally have a high aspect-ratio (i.e., the ratio of the average diameter to average thickness) and are highly delaminated. For example, in some embodiments, the mica platelets contained in the mica paper may have an aspect ratio of greater than about 50 or even greater than about 60. In other embodiments, the mica platelets may have an aspect ratio of greater than about 75, or even greater than about 80. For example, in some embodiments, the aspect-ratio of the mica platelets may be in a range from about 50 to about 150. While not wishing to be bound by theory, it is generally believed that high aspect-ratio mica platelets oriented in parallel with one another improve the mechanical strength, geometrical stability, and wear resistance of the roll assembly 202. Specifically, it is believed that the interfacial friction between the mica platelets improves the resistance of the platelets to pull-out during use, thereby improving the wear resistance of the roll assembly and decreasing the occurrence of defects in glass ribbons drawn with the pulling rolls.

In some embodiments described herein, the mica paper may be formed from phlogopite mica platelets so as to increase the temperature range in which the mica paper is stable. For example, the mica paper may be phlogopite or muscovite mica-paper commercially available from Chhaperia Mica Products, India; Cogebi Group, Belgium; Corona Films, USA; Glory Mica Co. Ltd., China; or Ruby Mica Co. Ltd., India. In some embodiments, this mica paper may not include a binder material. However, it should be understood that other types of mica paper may be used, including mica paper formed from other types of mica platelets and/or mica paper which includes a binder. For example, other suitable types of mica paper may include, without limitation, mica paper formed from fluorophlogopite mica (which is more thermally stable than phlogopite mica) or mica paper formed from muscovite mica.

Referring again to FIG. 2, mica paper of various thicknesses can be used to form the ring elements 220. For example, in some embodiments, the ring elements may have an uncompressed thickness greater than about 100 μm. Following compression, the ring elements 220 may have a compressed thickness of less than or equal to about 100 μm. However, it should be understood that mica paper with larger and smaller compressed thicknesses may also be used.

Ring elements 220 with compressed thicknesses as specified above facilitate forming a roll assembly 202 with the desired mechanical properties as well as the ability to withstand and/or mitigate damage to the contact surface caused by debris (i.e., glass particulates or the like) encountered during the glass drawing process. In particular, forming the roll assembly 202 from relatively thin ring elements 220 (i.e., ring elements with a compressed thickness of less than or equal to about 200 μm) permits debris or other particulate matter positioned on the contact surface 208 to be enveloped between adjacent ring elements 220 and/or between platelets within a single ring element such that the debris minimizes the flaws created on the surface of the glass ribbon or does not damage the surface of the glass ribbon when the roll assembly 202 contacts the glass ribbon.

While in some embodiments the mica paper used for the ring elements 220 has been described herein as being formed without a binder material, it should be understood that, in alternative embodiments, the mica paper may contain a binder material to improve the mechanical stability of the ring elements 220. For example, in some embodiments, the mica paper may be impregnated with a filler material which may further bind the mica platelets together. The filler material may be organic, semi-organic, or inorganic. When the filler material is organic, the filler material may be removed from the mica paper by pyrolysis or a chemical process (i.e., dissolved). In some embodiments, the filler material may be, for example, silicone or another polymeric resin which improves the mechanical stability of the mica paper without significantly decreasing the flexibility of the mica paper. In general, the filler material increases both the density of the mica paper and the hardness of the mica paper.

Figure 3:
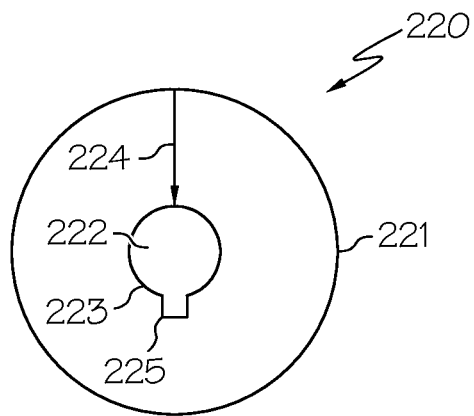
FIG. 3 schematically depicts a ring element formed from mica paper, according to one or more embodiments shown and described herein.

Referring to FIG. 3, in one particular embodiment, the ring elements 220 are impregnated with filler material such that the density of the ring elements decreases in a radial direction. For example, in one embodiment, the density of the ring elements near the outer diameter 221 of the ring element 220 may be lower than the density of the ring element 220 directly adjacent the central annulus 222. Accordingly, it should be understood that the density of the ring element increases in a radially inward direction as indicated by arrow 224. Pulling rolls constructed from such ring elements will generally have a density which is low at the contact surface of the pulling roll and increases radially inward toward the shaft member. The increased density at the center of the pulling roll prevents the pulling roll from slipping or rotating on the shaft of the pulling roll while the decreased density at the contact surface provides for a pulling roll assembly with a relatively soft contact surface (i.e., a contact surface with a lower Shore D hardness than the center of the roll).

While in an exemplary embodiment the ring elements 220 are described as being formed from mica paper, it should be understood that, in other embodiments, the ring elements 220 may be formed from other inorganic materials including, without limitation, ceramic materials, elemental metals, metal alloys or the like.

Referring now to FIG. 3 the inorganic material, such as the mica paper described hereinabove, is initially formed into a plurality of ring elements 220 (one depicted in FIG. 3) for use in forming the roll assembly of the pulling roll. In one embodiment, the ring elements 220 may be impregnated with a filler material to improve the mechanical strength of the ring elements, as described above. In the embodiments described herein, each ring element 220 is formed with a central annulus 222 to facilitate positioning the ring element 220 on the shaft member 204 of the pulling roll 200. While the annulus 222 is depicted in FIG. 3 as circular, it should be understood that the annulus may have other geometric shapes. For example, in embodiments where the ring elements 220 are installed on a shaft member which is hexagonal in cross section, the annulus 222 may also be hexagonal so as to prevent the ring elements 220 from rotating on the shaft. The ring element 220 may also be optionally formed with a keyway 225, as depicted in FIG. 3. In these embodiments the keyway engages with a corresponding key formed on the shaft member to prevent the ring elements 220 from rotating on the shaft member. In one embodiment, the annulus 222 and optional keyway 225 may be formed with a punching operation.

Prior to assembling the ring elements on the shaft member, the ring elements may be pre-fired to calcine the ring elements 220 to preempt hardening of the ring elements during subsequent usage at elevated temperatures. In one embodiment, the ring elements 220 are pre-fired by stacking the ring elements and heating them according to a heating schedule suitable for calcination. For example, the ring elements may be heated to a maximum temperature of about 700° C. at a ramp rate of 2° C./min and held at this maximum temperature for about 6 hours. In another embodiment, the ring elements may be calcined following assembly and compression of the ring elements.

In the embodiments described herein, the ring elements are stacked and axially compressed on the shaft member such that the pulling roll permits particles, such as tramp glass particles or other debris, to penetrate into the contact surface of the rolls such that the flaws caused by the particles are minimized and/or the particles do not contact the surface of the glass ribbon drawn by the pulling rolls, thereby reducing the occurrence of repetitive defects and/or cracking. The resistance (or compliance) of the contact surface of the pulling rolls can be qualitatively assessed using conventional hardness metrics, such as the Shore durometer metrics. The hardness of pulling rolls is typically measured with the Shore D scale and, in particular, according to ASTM D2240. The indenter used in the Shore D hardness measurement is conical, and, as such, the Shore D hardness measurement of the contact surface 208 is generally indicative of the ability of the roll assembly to envelope particles between adjacent ring elements 220 or within a single ring element. The smaller the Shore D number, the easier it is for particles to penetrate into the contact surface of the roll. A smaller Shore D number also indicates that the roll assembly is able to envelope larger particles.

In the embodiments of the pulling rolls 200 described herein, the contact surface 208 of the roll assembly 202 has a Shore D hardness of greater than or equal to about 10, or greater than or equal to 15, and less than or equal to about 60, as measured according to ASTM D2240. In some of these embodiments, the contact surface 208 of the roll assembly 202 has a Shore D hardness of greater than or equal to about 10 and less than or equal to about 50, or even less than or equal to about 40, as measured according to ASTM D2240. In still other embodiments, the Shore D hardness is greater than or equal to about 10 and less than or equal to about 30, as measured according to ASTM D2240.

Figure 4A:
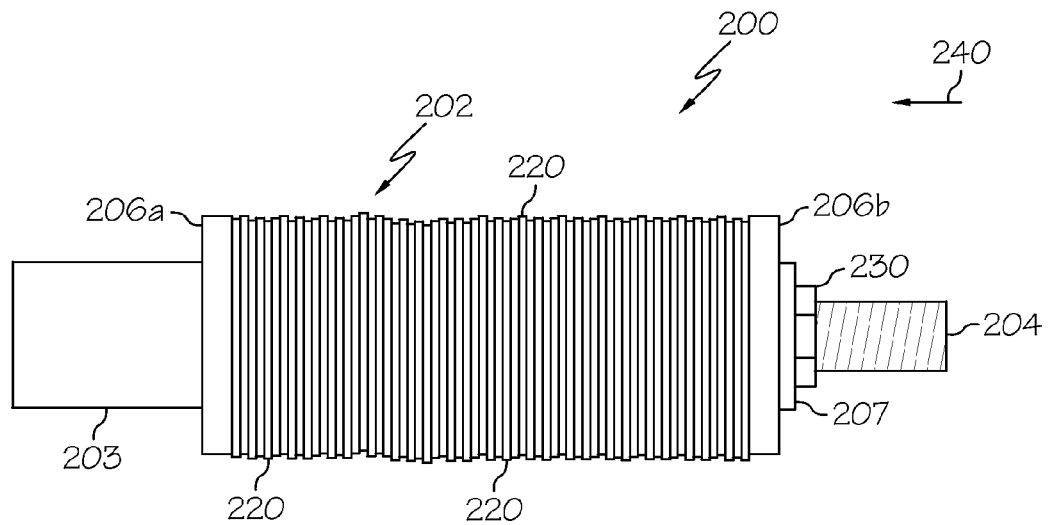
FIG. 4A schematically depicts a method of forming a pulling roll by stacking ring elements on a shaft member.

Referring now to FIG. 4A, in some embodiments, the pulling rolls are formed from a plurality of ring elements 220, each of which is approximately the same diameter. For example, the ring elements may be formed from mica paper, as described above, or another suitable inorganic material. In at least one embodiment, the ring elements are formed from mica paper impregnated with filler material such that the density of each ring element is graded in a radially direction, as described above. In this embodiment, a first retaining ring 206a is positioned on the shaft member 204 and secured against a shoulder 203 formed in the shaft member 204. The first retaining ring 206a facilitates uniformly compressing the ring elements 220 on the shaft member 204 in a subsequent step. However, it should be understood that the pulling roll 200 may be formed without the use of retaining rings.

After the first retaining ring 206a is positioned on the shaft member 204, the roll assembly 202 is formed by positioning the plurality of ring elements 220a on the shaft member 204 such that the ring elements are axially stacked on the shaft member 204 and a face of each ring element is in contact with the face of an adjacent ring element and/or the first retaining ring 206a.

When the ring elements 220 are positioned on the shaft member 204 in an uncompressed state (i.e., the ring elements 220 are positioned on the shaft member 204 such that the ring elements are in contact with one another but no compressing force is applied to the ring elements), the ring elements may slip relative to one another on the shaft member 204 such that the roll assembly cannot be effectively shaped to achieve the desired surface profile. Moreover, the uncompressed roll assembly 202 is generally not suitable for use in a glass manufacturing process. Accordingly, the roll assembly 202 must be compressed to facilitate both shaping of the roll assembly 202 and use of the roll assembly 202 in a glass manufacturing process.

The roll assembly 202 is compressed by applying a clamping pressure to the roll assembly 202 in the direction indicated by arrow 240. For example, the clamping pressure may be applied to the roll assembly 202 by rotating the nut 230 on the shaft member 204 to advance the nut 230, washer 207, and second retaining ring 206b in the direction indicated by arrow 240, thereby axially compressing the ring elements 220 between the nut 230 and the shoulder 203 and increasing the hardness of the roll assembly 202. In embodiments, where the ring elements are impregnated with filler material such that the density of the ring element decreases in an axial direction from the center of the ring element, the hardness of the roll assembly 202 decreases from the center of the pulling roll in a radially outward direction, creating an inner core portion with a first hardness directly adjacent to the shaft and an outer cladding portion surrounding the core portion, the cladding portion having a second hardness which is less than the hardness of the core portion. However, in embodiments where the ring elements are formed without a filler material, or in embodiments where the ring elements are formed with a filler material uniformly distributed throughout the ring element, the hardness of the roll assembly is uniform throughout the roll assembly. Generally, the roll assembly 202 is initially compressed by a first amount such that the contact surface of the roll assembly has a first Shore D hardness which facilitates formation of the desired surface profile in the contact surface of the roll assembly 202.

Figure 4B:
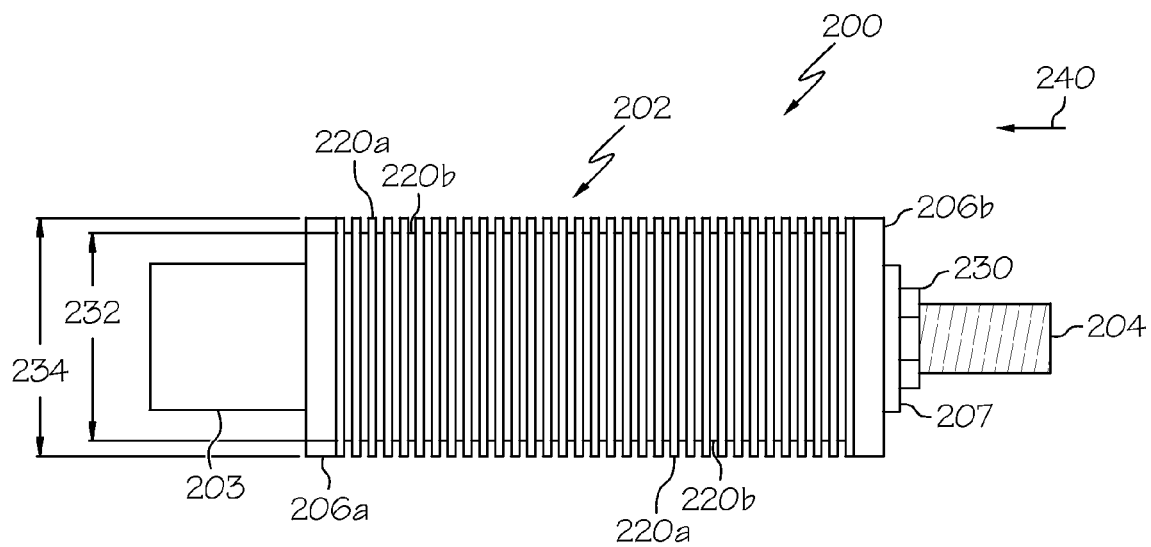
FIG. 4B schematically depicts a method of forming a pulling roll by stacking ring elements of differing diameters on a shaft member.
Figure 4C:
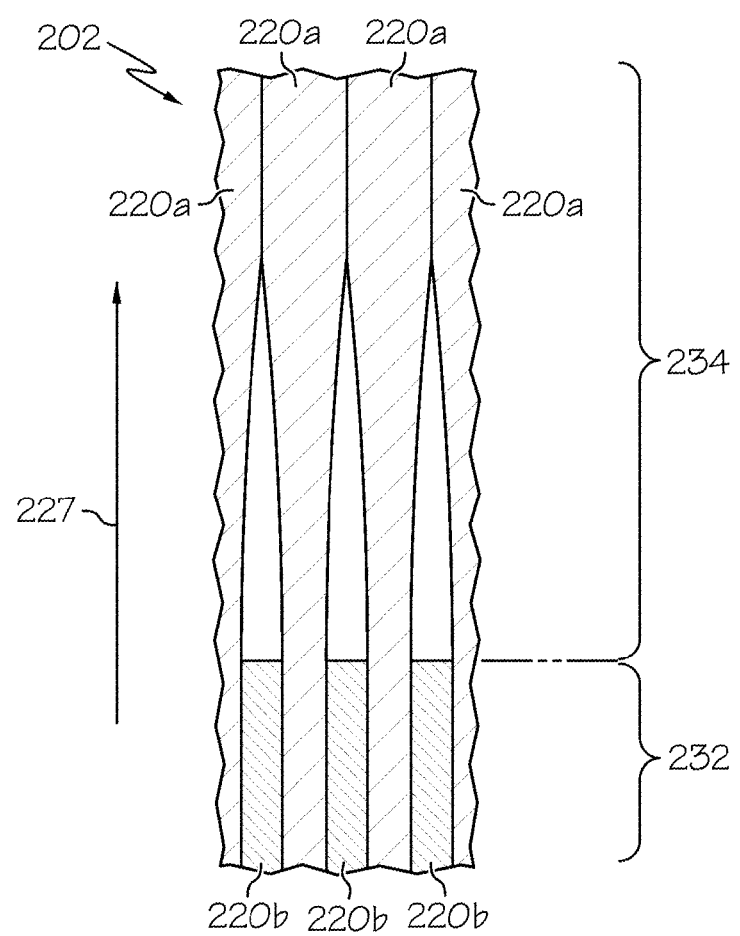
FIG. 4C schematically depicts a portion of the pulling roll of FIG. 4B in a compressed state.

Referring now to FIGS. 4B-4C, in an alternative embodiment, the desired Shore D hardness of the contact surface of the pulling roll 200 can be achieved by using ring elements of different sizes to form the roll assembly 202. In this embodiment, a first plurality of ring elements 220a each having a first diameter and at least one second plurality of ring elements 220b each having a second diameter less than the first diameter are used to construct the roll assembly. In this embodiment, the second plurality of ring elements 220b may be formed from a material which is the same as the first plurality of ring elements 220a or, alternatively, from a material which is different than the first plurality of ring elements 220a. For example, in embodiments where the first plurality of ring elements 220a are formed from mica paper, as described hereinabove, the second plurality of ring elements 220b may also be formed from mica paper. Alternatively, the second plurality of ring elements 220b may be formed from a material other than mica paper such as millboard, ceramic materials, metals, polymers or the like.

In order to construct this embodiment of the pulling roll 200, a first retaining ring 206a is positioned on the shaft member 204 and secured against a shoulder 203 formed in the shaft member 204. The first retaining ring 206a facilitates uniformly compressing the ring elements 220 on the shaft member 204 in a subsequent step. However, it should be understood that the pulling roll 200 may be formed without the use of retaining rings.

In one embodiment, after the first retaining ring 206a is positioned on the shaft member 204, the first plurality of ring elements 220a and the at least one second plurality of ring elements 220b are positioned on the shaft member 204 in an alternating manner such that ring elements 220b having the second diameter are interspersed between ring elements 220a having the first diameter, as depicted in FIG. 4B. The ring elements are axially stacked on the shaft member 204 such that a face of each ring element is in contact with the face of an adjacent ring element and/or the first retaining ring 206a. Laying up the ring elements of differing diameters on the shaft member 204 creates a roll assembly 202 which has a core portion 232 and a cladding portion 234 which surrounds the core portion 232. The diameter of the core portion 232 is approximately the same as the diameter of the second plurality of ring elements 220a and the diameter of the cladding portion 232 is approximately the same as the first plurality of ring elements 234. After the ring elements are compressed on the shaft (as described further herein), the core portion 232 of the roll assembly 202 has a solid volume fraction $fv_{cl}$ which is greater than the solid volume fraction $fv_c$ of the cladding portion 234. Accordingly, it can be demonstrated that the Shore D hardness of the cladding portion 234 of the roll assembly 202 is greater than the Shore D hardness of the core portion 232. Further, use of ring elements with differing diameters improves the traction between adjacent ring elements in the core portion 232 of the roll assembly such that the ring elements do not slip relative to one another while the cladding portion 234 remains soft and more compliant after the ring elements are compressed.

In the embodiment of the pulling roll 200 depicted in FIG. 4B, the first plurality of ring elements 220a and the at least one second plurality of ring elements 220b are arranged in an alternating pattern (i.e., B-L, B-L . . . B-L, where "B" is one of the first plurality of ring elements 220a and "L" is one of the second plurality of ring elements 220b and B-L is a unit intersperse pattern which is repeated over the length of the shaft member 204). However, it should be understood that other stacking sequences may be used to create different unit intersperse patterns other than the alternating unit intersperse pattern. By way of example, a unit intersperse pattern of B-L-L may be used. However, it should be understood that different unit intersperse patterns may be used.

Different unit intersperse patterns result in roll assemblies having contact surfaces with different hardnesses. For example, a stacking sequence which has a unit intersperse pattern of B-L produces a roll assembly 202 which has a higher Shore D value than a stacking sequence having a unit intersperse pattern of B-L-L. This is because the B-L-L unit intersperse pattern forms a roll assembly 202 in which the cladding portion 234 has a lower density than the B-L intersperse pattern.

Specifically, the solid volume fraction of the core portion and the cladding portion of the pulling roll describes the fraction of the volume of the core portion or the cladding portion which is occupied by solid material. In the case of pulling rolls formed from mica paper ring elements, the solid volume fraction describes the fraction of the volume of the core portion or the cladding portion which is occupied by mica crystals.

In the embodiments described herein, the solid volume fraction $fv_c$ of the core portion is defined as:

$$fv_c = \frac{\left(\frac{m_{core}}{\rho_{crystal}}\right)}{A_{core} t_{core}} = \frac{\rho_{areal}}{\rho_{crystal}} \frac{1}{t_{core}}$$

where $m_{core}$, $A_{core}$, and $t_{core}$, are the mass, area, and thickness, respectively, of the ring elements from which the core portion of the pulling rolls are formed, $\rho_{areal}$ is the areal density of the ring elements which is equal to $$\frac{m_{core}}{A_{core}},$$

and $\rho_{crystal}$ is the density of the material from which the ring elements are formed from. In the case of mica paper, $\rho_{crystal}$ is 2.9 g/cc.

When the first plurality of ring elements are formed from the same material and have the same areal density as the second plurality of ring elements, the solid volume fraction $fv_{cl}$ of the cladding portion is related to the solid volume fraction $fv_c$ of the core portion according to the relationship:

$$fv_{cl} = \left(\frac{n_b}{n_b + n_l}\right) fv_c$$

where $n_b$ is the number of ring elements in the first plurality of ring elements (i.e., the number of relatively large diameter ring elements) and $n_l$ is the number of ring elements in the second plurality of ring elements (i.e., the number of relatively small diameter ring elements).

When a B-L unit intersperse pattern is used to produce the roll assembly 202, the cladding solid volume fraction $fv_{cl}$ of the cladding portion 234 is 0.5 times the core solid volume fraction $fv_c$. However, when a B-L-L unit intersperse pattern is used to produce the roll assembly 202, the surface solid volume fraction $fv_{cl}$ of the cladding portion 234 is 0.33 times the core solid volume fraction $fv_{cl}$. This indicates that, for a fixed amount of compression applied to the roll assembly, the cladding portion of the roll assembly formed with a B-L unit intersperse pattern has a greater solid volume fraction than the cladding portion of a roll assembly formed with a B-L-L unit intersperse pattern. A relatively lower solid volume fraction of the cladding portion leads to a relatively lower Shore D value for the cladding portion. Accordingly, it should be understood that the hardness of the cladding portion of the pulling roll may be adjusted by increasing or decreasing the number of ring elements in each of the first plurality of ring elements and the second plurality of ring elements as well as the unit intersperse pattern of the ring elements.

In the embodiments described herein, the core solid volume fraction $fv_{cl}$ is generally greater than 0.60 while the cladding solid volume fraction $fv_c$ is generally less than or equal to 0.60.

In addition, Shore D hardness of the contact surface of the pulling rolls may be varied by increasing or decreasing the difference in the diameter of the first plurality of ring elements 220a and the at least one second plurality of ring elements 220b. For example, when the diameter of the first plurality of ring elements 220a is 50% greater than the diameter of the second plurality of ring elements 220b (i.e., the cladding portion 234 of the roll assembly 202 has a diameter which is 50% larger than the core portion 232 of the roll assembly 202), the contact surface of the pulling roll will be softer (i.e., the contact surface has a lower Shore D value) than when the diameter of the first plurality of ring elements 220a is only 10% greater than the diameter of the second plurality of ring elements 220b (i.e., the cladding portion 234 of the roll assembly 202 has a diameter which is 10% larger than the core portion 232 of the roll assembly 202). Accordingly, the Shore D value of the contact surface of the roll assembly 202 can be adjusted by controlling the relative diameters of the first plurality of ring elements 220a and the at least one second plurality of ring elements 220b.

Further, the Shore D hardness of the contact surface of the pulling roll may also be affected by other characteristics of the ring elements, including, without limitation, the thickness of the ring elements and the use of ring elements with different diameters to form the core portion of the roll assembly. For example, the Shore D hardness of the contact surface of the pulling roll may be lower when thinner ring elements are used for the first plurality of ring elements 220a relative to pulling rolls in which the first plurality of ring elements 220a are formed from thicker ring elements.

When the ring elements 220a, 220b are positioned on the shaft member 204 in an uncompressed state (i.e., the ring elements 220a, 220b are positioned on the shaft member 204 such that the ring elements are in contact with one another but before a compressing force is applied to the ring elements), the ring elements may slip relative to one another on the shaft member 204 such that the roll assembly cannot be effectively shaped to achieve the desired surface profile. Moreover, the uncompressed roll assembly 202 is generally not suitable for use in a glass manufacturing process. Accordingly, the roll assembly 202 must be compressed to facilitate both shaping of the roll assembly 202 and use of the roll assembly 202 in a glass manufacturing process.

Still referring now to FIG. 4B, the roll assembly 202 is compressed by applying a clamping pressure to the roll assembly 202 in the direction indicated by arrow 240. For example, the clamping pressure may be applied to the roll assembly 202 by rotating the nut 230 on the shaft member 204 to advance the nut 230 and second retaining ring 206b in the direction indicated by arrow 240, thereby axially compressing the ring elements 220a, 220b between the nut 230 and the shoulder 203. As the ring elements 220a, 220b are compressed, the ring elements 220a having larger diameters envelop the ring elements 220b, as is schematically depicted in the partial cross section of the roll assembly shown in FIG. 4C. In this embodiment, the solid volume fraction of the roll assembly 202 decreases from the outer diameter of the core portion of the pulling roll in a radially outward direction, as indicated by arrow 227, due to the additional spacing provided between adjacent ring elements 220a in the cladding portion 234 of the roll assembly 202. In general, the amount of compression imparted to the roll assembly 202 is sufficient to prevent the ring elements from spinning on the shaft member 204 during machining of the contact surface of the roll and during use of the roll in drawing glass ribbons. While the room temperature compression of the roll is important for machining the contact surface of the roll without the ring elements slipping on the shaft member, the compression of the roll at elevated operating temperatures is also important. As such, the thermal expansion of the shaft material and roll materials used is an important consideration to defining cold temperature compression to assure sufficient compression at operating temperature without the ring elements spinning on the shaft member.

Figure 5:
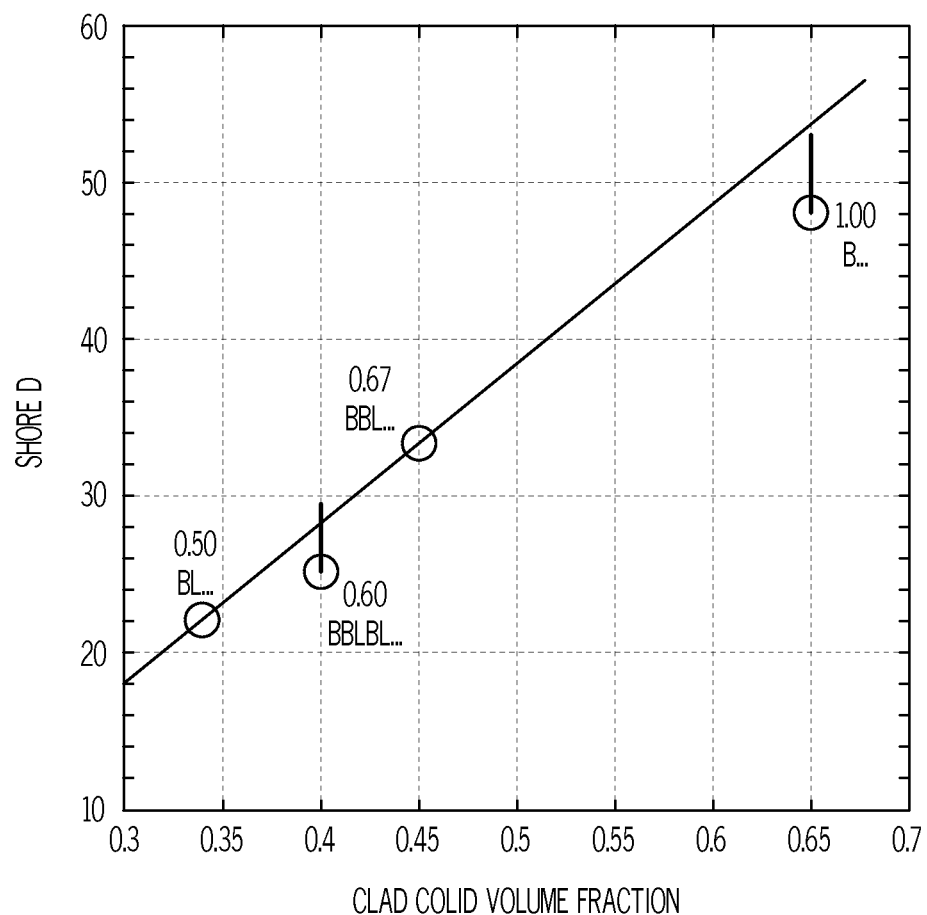
FIG. 5 graphically depicts the Shore D hardness (y-axis) as a function of the cladding solid volume fraction (x-axis) for pulling rolls formed with different unit intersperse patterns.

FIG. 5 graphically depicts the Shore D hardness of the contact surface (y-axis) as a function of the cladding solid volume fraction (x-axis) for about the same core solid volume fraction for pulling rolls formed from mica disks using different unit intersperse patterns. As demonstrated in FIG. 5, the Shore D hardness varies with the unit intersperse pattern due to the differences in the cladding solid volume fraction $fv_{cl}$. Specifically, FIG. 5 demonstrates that pulling rolls with surface hardnesses from a Shore D of 10 up to a Shore D of 60 may be obtained by varying the unit intersperse pattern of the ring elements. Accordingly, the use ring elements with different diameters enables the formation of pulling rolls with a previously unknown wide range of Shore D hardness values and, in addition, enables the formation of pulling rolls with Shore D hardness values as low as 10 and which are mechanically stable (i.e., the ring elements do not slip and rotate on the shaft member relative to one another).

Referring to FIGS. 4A and 4B, once the roll assembly 202 is suitably compressed, the roll assembly 202 is turned on a lathe to profile the roll assembly 202. Specifically, the contact surface 208 of the roll assembly 202 may be formed with various profiles to facilitate contacting and drawing a glass ribbon. For example, in the embodiment of the pulling roll 200 shown in FIG. 2, the roll assembly 202 is formed with a raised annular portion, hereinafter referred to as a pulling flat 210. While the roll assembly 202 is depicted with a single pulling flat 210, it should be understood that the roll assembly 202 may comprise more than one pulling flat. Alternatively, the roll assembly 202 may be formed without any pulling flats, such as when the roll assembly 202 is cylindrical. Moreover, it should also be understood that the contact surface 208 of the pulling roll 200 is not limited to the specific profiles shown and/or described herein and that the contact surface 208 may have other profiles.

Various techniques may be used to impart the desired surface profile to the roll assembly 202. For example, the roll assembly 202 may be shaped with a single-point tool or by use of a grinder. For roll assemblies with lower hardness values, use of a grinder to impart the desired surface profile to the roll assembly is more suitable than a single-point tool.

In some embodiments, the first amount of compression imparted to the roll assembly 202 to facilitate profiling of the roll assembly 202 generally hardens the roll assembly to a level which renders the roll assembly 202 unsuitable for use in drawing glass ribbons. Accordingly, in some embodiments, the roll assembly 202 must be decompressed before the roll assembly 202 can be used to draw glass ribbons. The roll assembly 202 is decompressed by releasing some of the clamping pressure applied to the ring elements 220 of the roll assembly. For example, in the embodiments of the pulling rolls described herein, the nut 230 may be loosened a predetermined amount which allows the ring elements 220 to expand slightly, thereby decreasing the hardness of the roll assembly. After decompression, the roll assembly 202 has a second Shore D hardness which is less than the first Shore D hardness of the roll assembly 202 after profiling.

The pulling rolls described herein also demonstrate improved wear resistance relative to pulling rolls formed from conventional materials, such as millboard and the like. Specifically, it has been found that the pulling rolls formed from mica paper do not degrade as quickly as pulling rolls formed from millboard materials operated under similar conditions. Accordingly, the pulling rolls described herein have a longer service life than conventional pulling rolls, thereby reducing glass production costs.

EXAMPLES

To further illustrate the principles of the present disclosure, the following examples are set forth. The examples are intended to be purely exemplary of the disclosure and are not intended to limit the scope of the appended claims. Efforts have been made to ensure accuracy with respect to numbers (e.g., amounts, temperatures, etc.); however, some errors and deviations can occur.

Example 1

Four pulling rolls (Samples A-D) were constructed from mica paper ring elements having diameters of 1.5 inches (3.81 centimeters) and 2.2 inches (5.588 centimeters). The mica in the mica paper ring elements had a crystal density of approximately 2.9 g/cc. The mica paper ring elements were pre-fired to a maximum temperature of about 700° C. at a ramp rate of 2° C./min and held at this maximum temperature for about 6 hours. Following the pre-firing step, the ring elements had an areal density of approximately 1.058 g/in². The ring elements were assembled on to a shaft member having a diameter of approximately 0.75 inches (approximately 1.905 centimeters) and compressed to the core solid volume fraction indicated in Table A. A different unit intersperse pattern was used for each pulling roll. In addition to the core solid volume fraction, Table A also lists the unit intersperse pattern for each pulling roll as well as the calculated cladding solid volume fraction and the measured Shore D hardness of the contact surface of the pulling roll. FIG. 5 graphically depicts the Shore D hardness as a function of the cladding solid volume fraction. FIG. 5 demonstrates that the Shore D hardness of the contact surface of the pulling roll increases with the cladding solid volume fraction $fv_{cl}$.

TABLE A

| Example | Unit intersperse pattern | Core Solid Volume Fraction | Clad Solid Volume Fraction | Shore D (+/−2) |
|---------|--------------------------|----------------------------|----------------------------|----------------|
| A | BL . . . | 0.68 | 0.34 | 22 |
| B | BBLBL . . . | 0.66 | 0.40 | 25 |
| C | BBL . . . | 0.68 | 0.45 | 33 |
| D | B . . . | 0.65 | 0.65 | 48 |

Example 2

Figure 6:
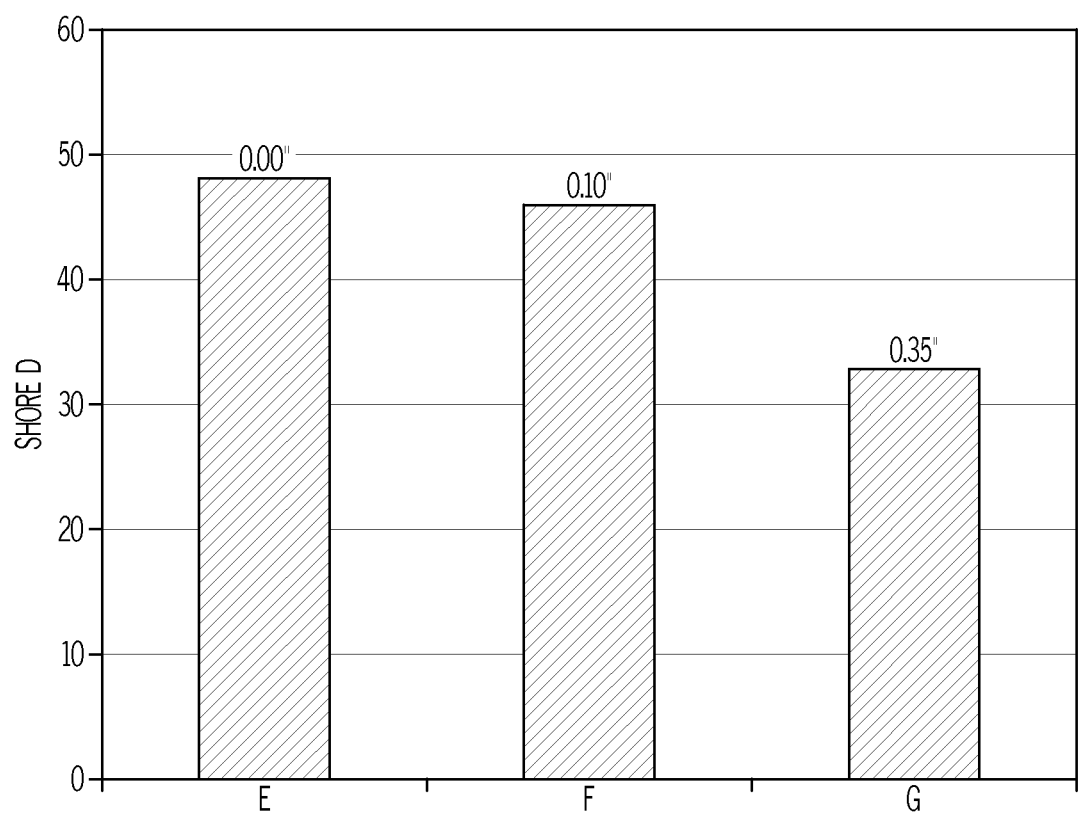
FIG. 6 graphically depicts the Shore D hardness (y-axis) for pulling rolls having claddings with different radial thicknesses.

Three pulling rolls (Samples E-G) were constructed from large and small diameter mica paper ring elements. In each sample the large ring elements had a diameter of 2.2 inches (5.588 centimeters). The small ring elements of Sample E also had a diameter of 2.2 inches (5.588 centimeters) such that the cladding portion and the core portion had the same diameter (i.e., $D_{cl}-D_c=0$). The small ring elements of Sample F had a diameter of 2.0 inches (5.08 centimeters) such that the diameter of the core portion was 0.2 inches (0.508 centimeter) less than the diameter of the cladding portion and the cladding portion had a radial thickness of 0.1 inches (0.254 centimeter). The small ring elements of Sample G had a diameter of 1.5 inches (3.81 centimeters) such that the diameter of the core portion was 0.7 inches (1.778 centimeters) less than the diameter of the cladding portion and the cladding portion had a radial thickness of 0.35. The mica in the mica paper ring elements had a crystal density of approximately 2.9 g/cc. The ring elements were pre-fired to a maximum temperature of about 700° C. at a ramp rate of 2° C./min and held at this maximum temperature for about 6 hours. Following the pre-firing step, the ring elements had an areal density of approximately 1.058 g/in². The ring elements were assembled on to a shaft member having a diameter of approximately 0.75 inches and compressed to the core solid volume fraction indicated in Table B. The unit intersperse pattern for each pulling roll was B-B-L. Table B below lists the radial thickness of the cladding portion for each pulling roll as well as the calculated core and cladding solid volume fractions and the measured Shore D hardness of the contact surface of the pulling roll. FIG. 6 demonstrates that the Shore D hardness of the contact surface of the pulling rolls decreased as the radial thickness of the cladding increased for pulling rolls having the same diameter.

TABLE B

| Sample | Radial Thickness of Cladding | Core Solid Volume Fraction | Clad Solid Volume Fraction | Shore D |
|--------|------------------------------|----------------------------|----------------------------|---------|
| E | 0.00" | 0.65 | 0.65 | 48 |
| F | 0.1" | 0.72 | 0.48 | 46 |
| G | 0.35" | 0.68 | 0.45 | 33 |

Example 3

Figure 7:
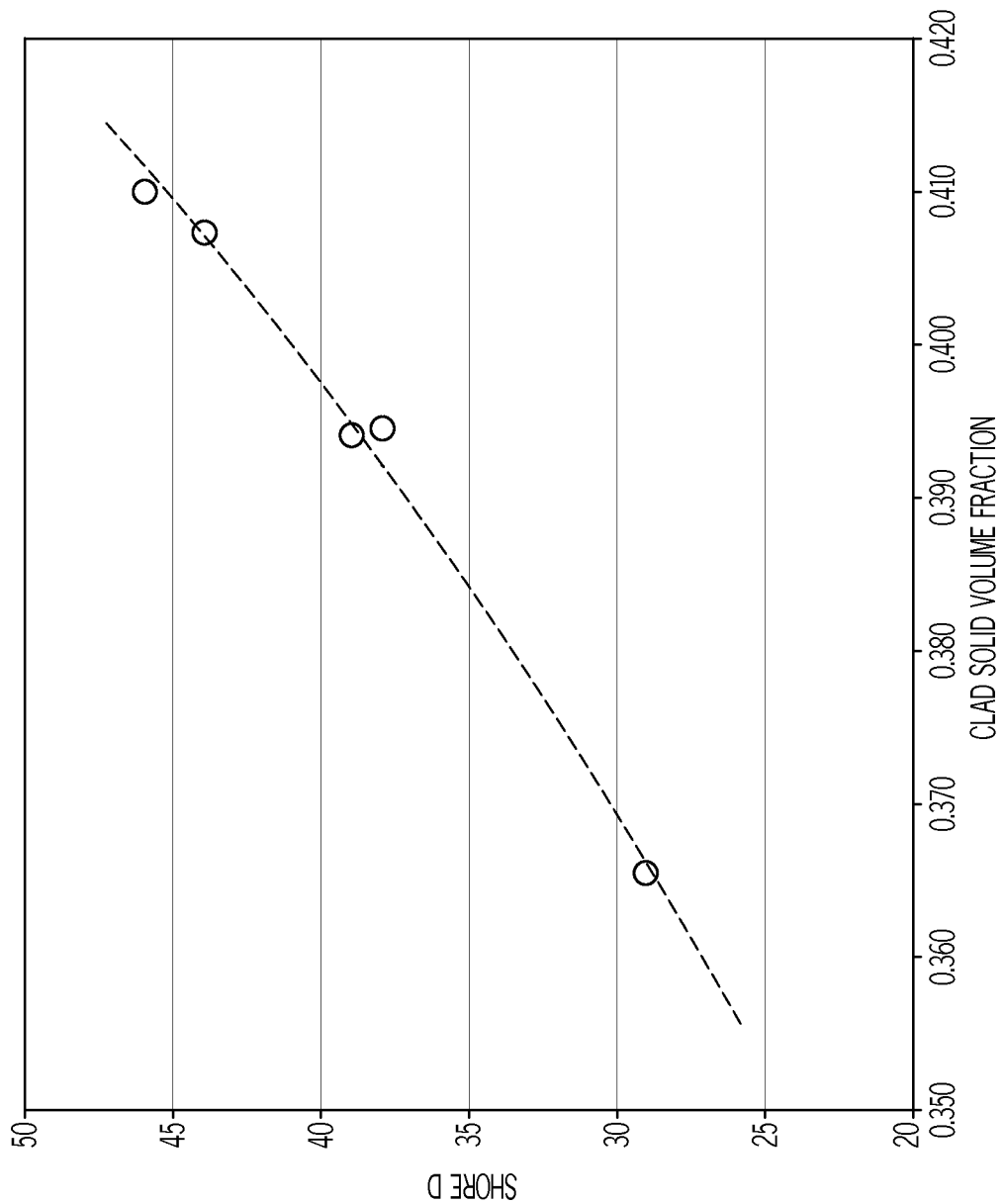
FIG. 7 graphically depicts the Shore D hardness (y-axis) as a function of the solid volume fraction of the cladding for pulling rolls compressed by different amounts.

Six pulling rolls (Samples H-M) were constructed from mica paper ring elements having diameters of 2.2 inches (5.588 centimeters) and 1.5 inches (3.81 centimeters). The mica of the mica paper ring elements had a crystal density of approximately 2.9 g/cc. The ring elements were pre-fired to a maximum temperature of about 700° C. at a ramp rate of 2° C./min and held at this maximum temperature for about 6 hours. Following the pre-firing step, the ring elements had an areal density of approximately 0.0976 g/in². The ring elements were assembled on to a shaft member having a diameter of approximately 0.75 inches and compressed. Each pulling roll was compressed with a different amount of compression force to achieve the core densities listed in Table C. The unit intersperse pattern B-B-L-B-L was used for each pulling roll. Table C below lists the length/number which is the compressed length of the roll divided by the number of disks in the roll. Table C also lists the core density, the cladding density, the calculated cladding solid volume fraction, and the measured Shore D hardness of the contact surface of the pulling roll. The data in Table C generally indicates that the hardness of the pulling rolls increased with the amount by which the ring elements of the roll assembly were compressed as determined by the decrease in the length of the pulling roll. FIG. 7 graphically depicts the Shore D hardness as a function of the cladding solid volume fraction. FIG. 7 demonstrates that the Shore D hardness of the contact surface of the pulling rolls increased with increasing solid volume fraction of the clad which, in turn, increased with the amount by which the ring elements were compressed.

TABLE C

| Sample | Length/Number (mils) | Core Density (g/cc) | Clad Density (g/cc) | Clad Solid Volume Fraction | Shore D (+/−3) |
|--------|----------------------|---------------------|---------------------|----------------------------|----------------|
| H | 3.371 | 1.766 | 1.060 | 0.3655 | 29 |
| I | 3.124 | 1.905 | 1.143 | 0.3941 | 39 |
| J | 3.121 | 1.906 | 1.144 | 0.3945 | 38 |
| K | 3.091 | 1.925 | 1.155 | 0.3983 | 41 |
| L | 3.054 | 1.948 | 1.169 | 0.4031 | 44 |
| M | 3.004 | 1.982 | 1.189 | 0.4100 | 46 |

Example 4

Figure 8:
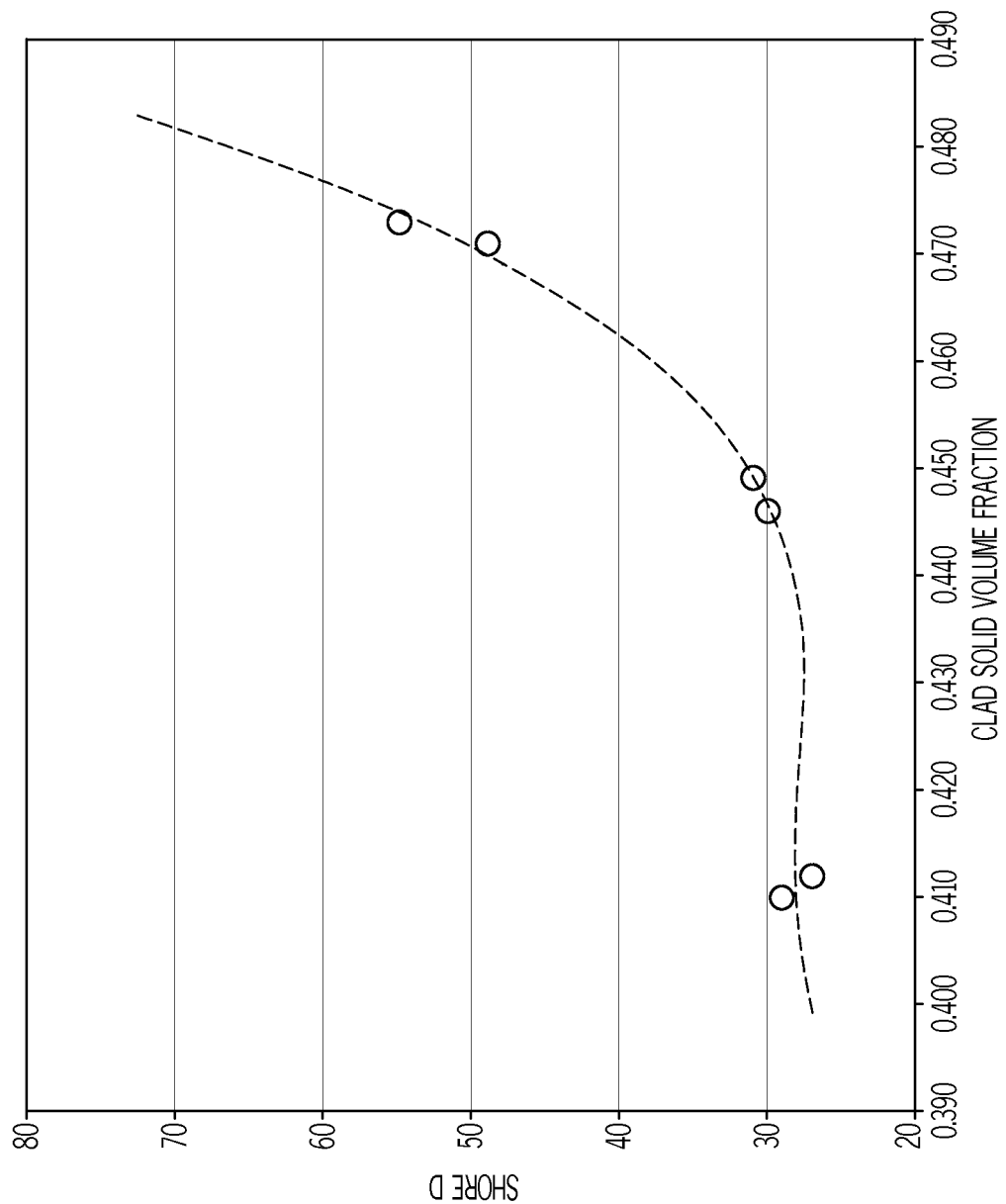
FIG. 8 graphically depicts the Shore D hardness (y-axis) as a function of the solid volume fraction of the cladding for pulling rolls compressed with different compression forces.

Six pulling rolls (Samples N-S) were constructed from mica paper ring elements having diameters of 5.125 inches (13.02 centimeters) and 4.6 inches (11.68 centimeters). The mica of the mica paper ring elements had a crystal density of approximately 2.9 g/cc. The mica paper ring elements were not pre-fired. The ring elements had an areal density of approximately 0.0976 g/in² to 0.1143 g/in². The ring elements were assembled on to a shaft member having a diameter of approximately 0.75 inches (approximately 1.905 centimeters) and compressed. Each pulling roll was compressed with a different compression force. The unit intersperse pattern B-B-L-B-L was used for each pulling roll. Table D below lists the compression force utilized for each pulling roll, the core density, the cladding density, the calculated cladding solid volume fraction, and the measured Shore D hardness of the contact surface of the pulling roll. The data in Table D generally indicates that the hardness of the pulling rolls increased with the applied compression force. FIG. 8 graphically depicts the Shore D hardness as a function of the cladding solid volume fraction. FIG. 8 demonstrates that the Shore D hardness of the contact surface of the pulling rolls increased with increasing solid volume fraction of the cladding which, in turn, increased with the amount of compression force applied to the ring elements.

TABLE D

| Sample | Compression Pressure (psi) | Core Density (g/cc) | Clad Density (g/cc) | Clad Solid Volume Fraction | Shore D (+/−3) |
|---|---|---|---|---|---|
| N | 101 | 1.98 | 1.19 | 0.410 | 29 |
| O | 121 | 1.99 | 1.19 | 0.412 | 27 |
| P | 110 | 2.16 | 1.29 | 0.446 | 30 |
| Q | 129 | 2.17 | 1.30 | 0.449 | 31 |
| R | 194 | 2.28 | 1.37 | 0.471 | 49 |
| S | 207 | 2.29 | 1.37 | 0.473 | 55 |

Based on the foregoing, it should now be understood that the pulling rolls described herein can be used in conjunction with a glass manufacturing apparatus to produce glass ribbons. The pulling rolls described herein facilitate the formation of glass substrates with fewer defects as the pulling rolls are more wear resistant than pulling rolls formed from fibrous material, such as millboard. In addition, the large diameter and high aspect ratio of the mica platelets and the frictional force between the mica platelets in the paper reduces the occurrence of platelet pull-out during use and, as a result, decreases the occurrence of defects on the surface of the glass substrates and extends the service life of the pulling rolls.

Moreover, forming the pulling rolls with the hardness values specified herein enables the pulling rolls to envelop debris and other particulate material which may be incident on the contact surface of the pulling rolls, thereby further reducing the formation of defects in the glass ribbon.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A pulling roll comprising:
   a shaft member;
   a roll assembly positioned on the shaft member for rotation with the shaft member, the roll assembly comprising an axially compressed stack of ring elements formed from mica paper, the mica paper comprising layers of overlapping mica platelets oriented substantially in parallel with one another, wherein:
      a contact surface of the roll assembly has a Shore D hardness greater than or equal to about 10 and less than or equal to about 60; and
   wherein the ring elements are impregnated with a filler material such that a density of the roll assembly increases radially inward from the contact surface of the roll assembly.

2. The pulling roll of claim 1, wherein the Shore D hardness of the contact surface of the roll assembly is less than or equal to about 30.

3. The pulling roll of claim 1, wherein the ring elements are pre-fired.

4. The pulling roll of claim 1, wherein the ring elements are pre-fired by heating the ring elements to a maximum temperature of about 700° C. at a ramp rate of 2° C./min and held at the maximum temperature for about 6 hours.

5. The pulling roll of claim 1, wherein the axially compressed stack of ring elements comprises:
   a first plurality of ring elements, individual ones of the first plurality of ring elements having a first outer diameter, wherein the first plurality of ring elements are formed from the mica paper; and
   a second plurality of ring elements, individual ones of the second plurality of ring elements having a second outer diameter which is less than the first outer diameter, wherein the first plurality of ring elements are interspersed with the second plurality of ring elements on the shaft member to form the roll assembly such that the roll assembly has a core portion surrounded by a cladding portion, the cladding portion forming the contact surface of the roll assembly.

6. The pulling roll of claim 5, wherein the second plurality of ring elements are formed from a material other than mica paper.

7. The pulling roll of claim 5, wherein the core portion of the roll assembly has a Shore D hardness which is greater than the Shore D hardness of the contact surface of the roll assembly.

8. The pulling roll of claim 5, wherein individual ones of the first plurality of ring elements and individual ones of the second plurality of ring elements are alternately arranged on the shaft member.

9. The pulling roll of claim 5, wherein individual ones of the first plurality of ring elements and individual ones of the second plurality of ring elements are arranged on the shaft member in a unit intersperse pattern which is sequentially repeated over a length of the shaft member.

10. The pulling roll of claim 5, wherein the cladding portion of the roll assembly has a cladding solid volume fraction $fv_{cl}$ less than or equal to 0.60.

11. The pulling roll of claim 5, wherein the core portion of the roll assembly has a core solid volume fraction $fv_c$ greater than or equal to 0.60.

12. A pulling roll comprising:
   a shaft member;
   a roll assembly positioned on the shaft member for rotation with the shaft member, the roll assembly comprising an axially compressed stack of ring elements formed from inorganic material, wherein:
      a core portion of the roll assembly has a Shore D hardness which is greater than a Shore D Hardness of a contact surface of a cladding portion of the roll assembly; and
      the contact surface of the roll assembly has a Shore D hardness greater than or equal to about 10 and less than or equal to about 60.

13. The pulling roll of claim 12, wherein the Shore D hardness of the contact surface of the roll assembly is less than or equal to about 30.

14. The pulling roll of claim 13, wherein the ring elements are formed from mica paper, the mica paper comprising layers of overlapping mica platelets oriented substantially in parallel with one another.

15. The pulling roll of claim 12, wherein the axially compressed stack of ring elements comprises:
- a first plurality of ring elements, individual ones of the first plurality of ring elements having a first outer diameter;
- a second plurality of ring elements, individual ones of the second plurality of ring elements having a second outer diameter less than the first outer diameter, wherein the first plurality of ring elements are interspersed with the second plurality of ring elements on the shaft member to foam the roll assembly.

16. The pulling roll of claim 15, wherein the second plurality of ring elements are formed from a material that is different than a material of the first plurality of ring elements.

17. The pulling roll of claim 15, wherein individual ones of the first plurality of ring elements and individual ones of the second plurality of ring elements are alternately arranged on the shaft member.

18. The pulling roll of claim 15, wherein individual ones of the first plurality of ring elements and individual ones of the second plurality of ring elements are arranged on the shaft member in a unit intersperse pattern which is sequentially repeated over a length of the shaft member.

\* \* \* \* \*